United States Patent

[11] 3,604,281

| [72] | Inventor | Howard G. Shambaugh |
| --- | --- | --- |
| | | River Forest, Ill. |
| [21] | Appl. No. | 865,260 |
| [22] | Filed | Oct. 10, 1969 |
| [45] | Patented | Sept. 14, 1971 |
| [73] | Assignee | Lovejoy, Inc. |
| | | River Forest, Ill. |

[54] POSITIVE DRIVE VARIABLE SPEED DEVICE
15 Claims, 13 Drawing Figs.

| [52] | U.S. Cl. | 74/230.5 |
| --- | --- | --- |
| [51] | Int. Cl. | F16h 55/36 |
| [50] | Field of Search | 74/230.17, 230.18, 230.16, 230.15, 230.5, 230.14, 244; 29/159 |

[56] References Cited

UNITED STATES PATENTS

| 747,478 | 12/1963 | Reed | 74/244 |
| --- | --- | --- | --- |
| 1,847,567 | 3/1932 | Lorenz | 29/159 |
| 3,170,381 | 2/1965 | Wanielista | 74/230.01 |

*Primary Examiner*—C. J. Husar
*Attorney*—Parker, Carter & Markey

ABSTRACT: A positive drive, variable speed device in which a belt support is formed of an elongated strip, the strip being coilable to vary its diameter and having longitudinal edge portions and a central slotted portion bendable to match the pitch diameter and pitch dimension of a continuous, toothed drivebelt and a pulley mounting for the belt support.

PATENTED SEP 14 1971 3,604,281
SHEET 1 OF 2
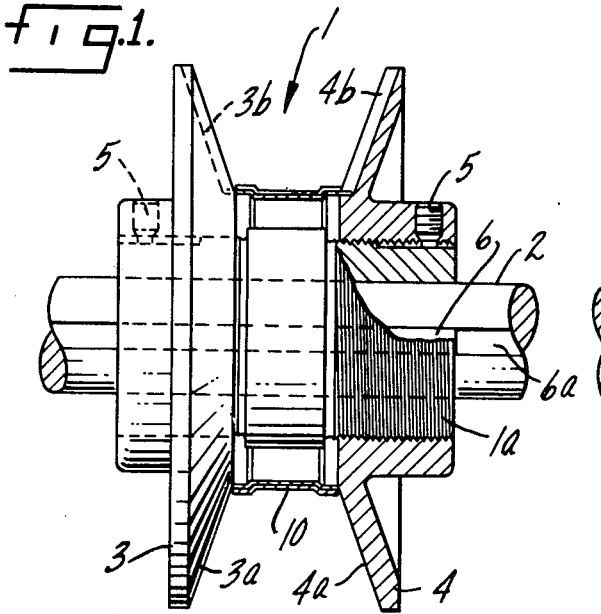
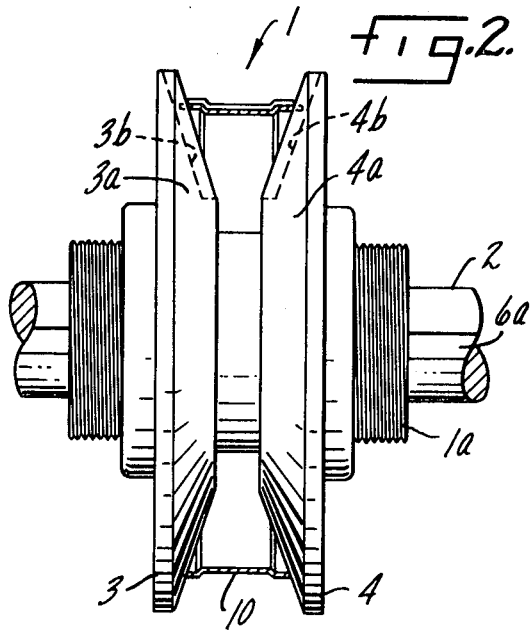
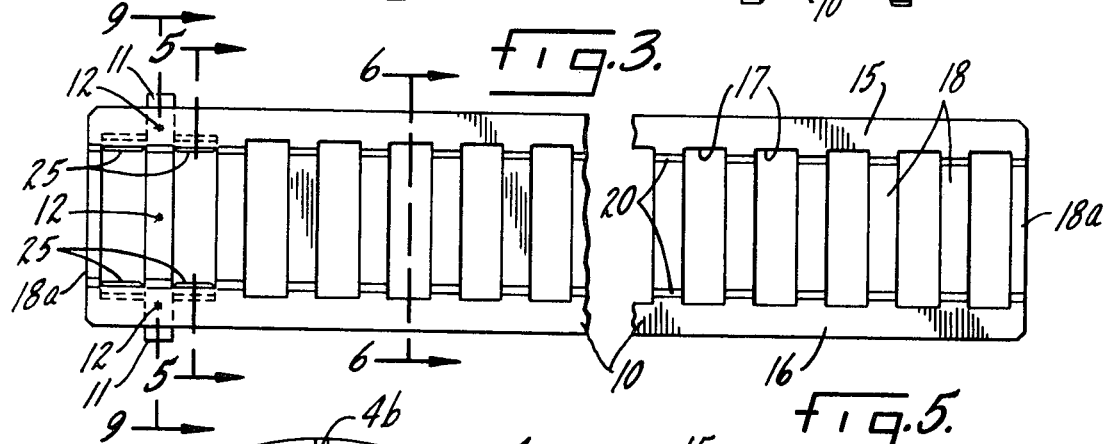
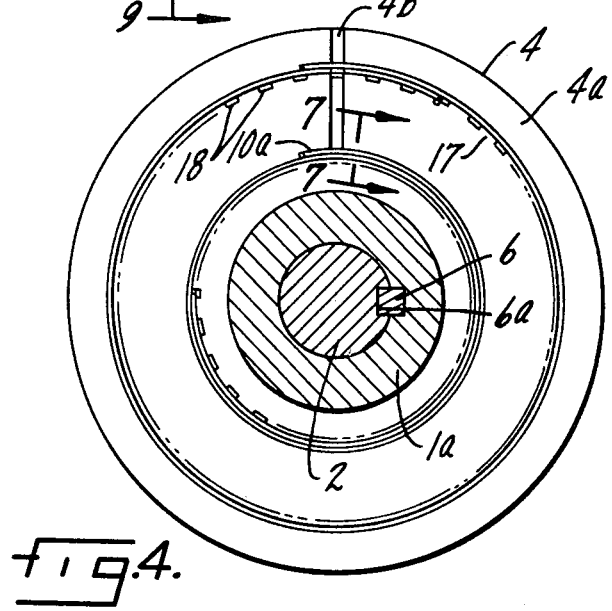
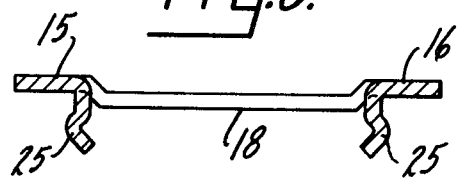
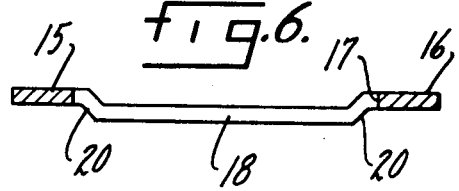
INVENTOR.
Howard G. Shambaugh
BY Parker, Carter & Markey
Attorneys.

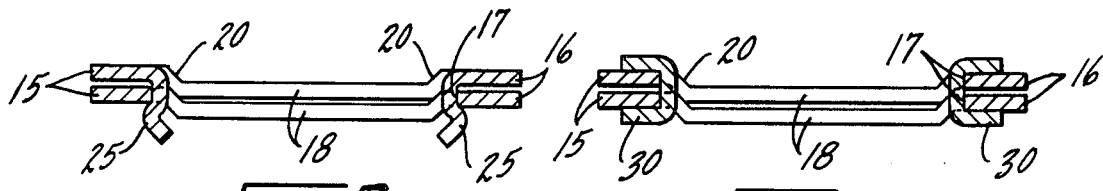
fig.7.  fig.8.
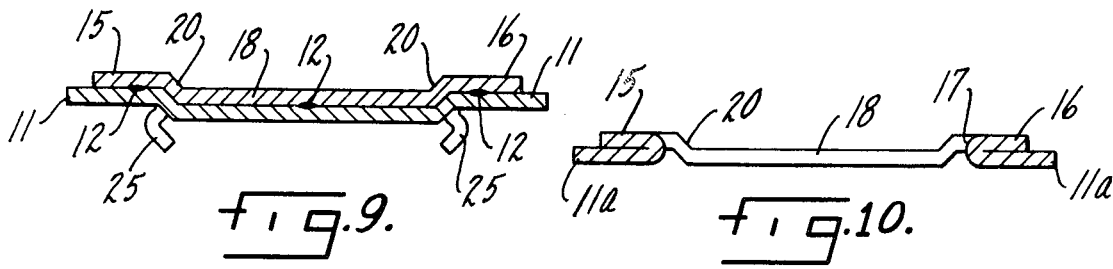
fig.9.  fig.10.
fig.11.
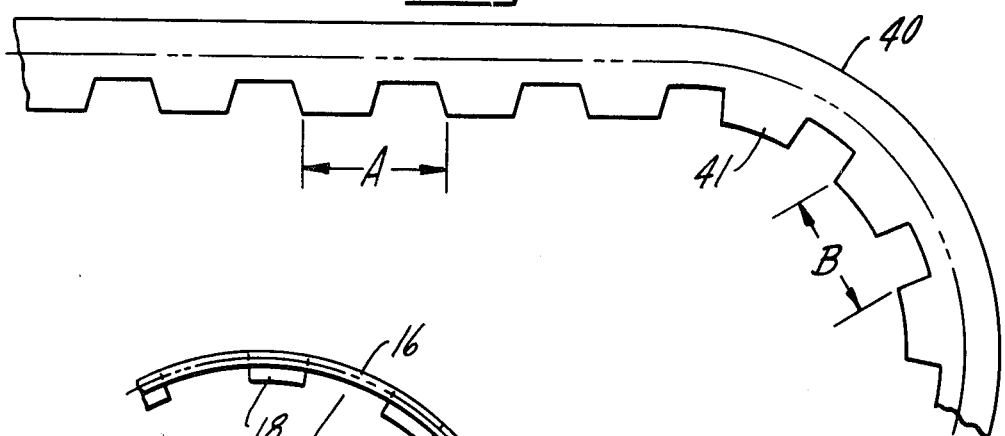
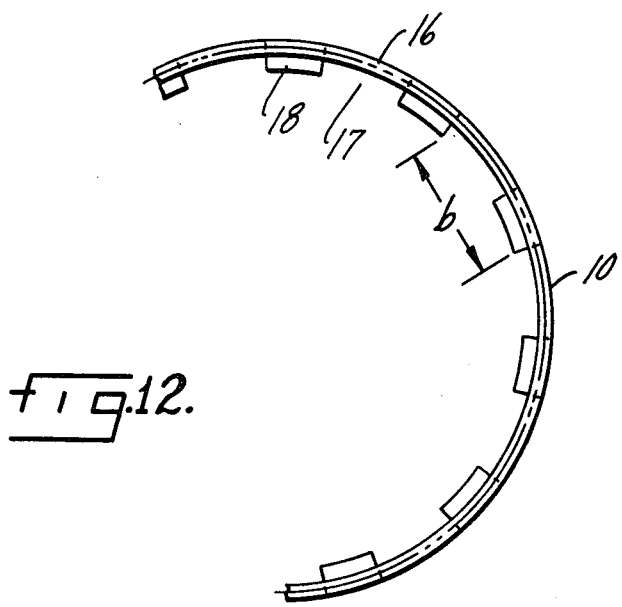
fig.12.
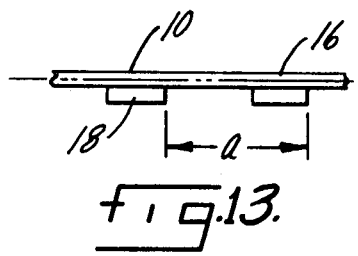
fig.13.
INVENTOR.
Howard G. Shambaugh
BY Parker, Carter & Markey
Attorneys.

3,604,281

POSITIVE DRIVE VARIABLE SPEED DEVICE

SUMMARY OF THE INVENTION

A pulley hub or belt support for a toothed or cogged, continuous, flexible timing or drivebelt is formed of an elongated strip of bendable material. The strip has longitudinal edge portions bendable to match the pitch diameter of the belt at variable belt diameters and a slotted portion bendable to match the pitch dimension of the belt at various belt diameters. The strip is coilable upon itself to vary its diameter. A pulley includes relatively movable segments which may have elongated, tapered, opposed faces supporting the strip in its varying diameter configurations, the strip and pulley being keyed to prevent slippage. The strip is provided with means securing it in its desired coiled, overlapped, substantially circular or rotatable configuration and at its desired diameter.

This invention relates to variable speed devices and has as one of its purposes the provision of a positive drive, variable speed device of maximum economy in manufacture and use.

Another purpose is to provide a positive drive device productive of a wide range of speed ratios.

Another purpose is to provide a device, the speed of which may be varied with a minimum employment of tools, labor and time.

Another purpose is to provide a variable diameter means for positive driving engagement with a toothed belt.

Another purpose is to provide a positive, nonslip, accurate, variable speed device adapted to drive or be driven at a preselected speed ratio.

Another purpose is to provide a rotatable support for toothed belts, the support being variable in diameter and adapted to correspond to the pitch diameter and pitch dimension of the supported belt at varying diameters of said support.

Another purpose is to provide a method of forming a variable speed device and of varying the speed thereof.

Other purposes may appear from time to time during the course of the specification and claims.

BRIEF DESCRIPTION OF THE DISCLOSURE

The invention is illustrated more or less diagrammatically in the accompanying drawings, wherein:

FIG. 1 is a side elevation illustrating the invention ready for use;

FIG. 2 is a side view similar to FIG. 1 with the belt support of the invention in a second configuration;

FIG. 3 is a top plan view of the belt support of the invention;

FIG. 4 is a side view showing the belt support in two configurations;

FIG. 5 is a view taken on a line 5—5 of FIG. 3;

FIG. 6 is a view taken on the line 6—6 of FIG. 3;

FIG. 7 is a view taken on a line 7—7 of FIG. 4;

FIG. 8 is a detail view illustrating a variant form of the structure of FIG. 7;

FIG. 9 is a view taken on the line 9—9 of FIG. 3;

FIG. 10 is a detail view of a variant form of locking means;

FIG. 11 is a partial side illustration of a toothed belt;

FIG. 12 is a partial side view of a belt support; and

FIG. 13 is a partial side view of the belt support of FIG. 3.

Like parts are indicated by like numerals throughout the specification and drawings.

DESCRIPTION OF THE PREFERRED EMBODIMENT

Referring now to the drawings, and particularly to FIG. 1, the numeral 1 generally designates a pulley structure. The pulley structure 1 is mounted on shaft 2, which may be either a driven or a driving shaft, and is formed of segments 3 and 4. Either or both of the pulley halves 3,4 may be slidable on shaft 2. As shown, the segments may be keyed, as at 5, to a threaded sleeve 1a which may in turn be suitably keyed to shaft 2 as indicated generally at 6,6a.

Forming a central hub, belt support or belt engaging means between the pulley segments 3,4 is a strip of bendable material, such as relatively thin metal, indicated by the numeral 10. The pulley segments 3,4 are individually radially slotted along their tapered opposed faces 3a, 4a as indicated at 3b, 4b respectively. Ears 11 extend outwardly, laterally in opposite directions from the strip 10 for reception in slots 3b, 4b to preclude relative rotation or slippage between the pulley 1 and belt engaging strip 10.

As shown in FIGS. 3 and 9, the ears 11 are formed by securing, as by spotwelds 12, a relatively thin link of substantially rigid material to the underside of strip 10, the link taking the overall cross-sectional configuration of strip 10 and extending beyond the longitudinal edges thereof as shown. Individual ear pieces (not shown) could be spot welded beneath edge portions 15, 16, the intermediate segment beneath joinder strip 18 being dispensed with, if desired.

The strip 10 is formed of bendable material, such as metal for example, and includes a body or edge portion formed of spaced longitudinal edge portions 15,16. The central or slot portion of strip 10 between edge portions 15,16 has formed therein, throughout substantially the entire length of strip 10, a plurality of identically dimensioned, equally longitudinally spaced, tooth-receiving slots or openings 17. The slots 17 are spaced by equidimensioned strip portions 18 joining the edge portions 15,16 between each pair of slots 17. Cross portions such as that shown at 18a join the ends of edge portions 15, 16.

Referring now to FIGS. 5—10, it will be observed that the edge portions 15, 16 lie in a first plane and that the cross portions 18 and 18a lie in a paralleling plane offset from that occupied by the edge portions 15,16 the portions 18,18a joining portions 15,16 in outwardly, upwardly inclined segments 20 of strip 10.

Referring now to FIG. 4, the elongated strip 10 is shown as coiled for use at a first, smaller diameter, such as that shown for example in FIG. 1. The overlapping exposed end portion 10a is secured to the underlying portion of the strip 10 in order to retain the strip in the substantially circular coiled configuration shown in FIG. 4. As illustrated in FIGS. 3 and 5, the overlying end portion of strip 10 includes downwardly disposed clip segments 25. The segments 25 may be conveniently formed of material otherwise removed in forming one or more of the slots 17 adjacent one end of strip 10. As best seen in FIG. 7, the depending segments 25 may be pressed downwardly through aligned slots 17 in an underlying portion of the strip 10 and thereafter permitted to snap outwardly beneath edge portions 15,16 of the underlying strip portion to secure the strip in the substantially circular configuration shown. As shown, segments 25 form yieldable, snap-action elements which snap beneath the underlying part of strip 10 when pressed through a slot 17 therein.

As reflected in FIGS. 2 and 4, the strip 10 may be coiled to form a substantially circular belt support or central hub for the pulley structure 1 of a wide variance in diameters. As illustrated, for example, the strip 10 may have a maximum diameter of the order of at least twice the diameter of its minimum diameter shown in FIG. 1. In any event, the opposed faces 3a, 4a of the pulley segments 3,4 are of sufficient radial dimension to provide for such maximum and minimum diameter configuration of the strip 10. As shown in FIGS. 1 and 2, the pulley segments 3,4 are relatively movable toward and away from each other and slots 3b, 4b are axially aligned to provide for reception of the ears 11 and support 10 from its minimum to its maximum diameter configurations. It will be understood that other forms of pulley segments and means for mounting the support 10 may be employed without departing from the nature and spirit of the invention.

In FIG. 8 a separate set of clips 30 are shown as alternate means for securing the overlapping portions of the strip, the segments 25 being dispensed with in such event. The clips 30 are substantially U-shaped and are positioned within a set of overlying slots 17 to grasp and clamp together the overlying edge segments 15,16. The clips 30 may be spot welded or otherwise suitably secured in place.

Referring now to FIG. 10, an alternate manner of forming the ears 11 is illustrated. In the form of FIG. 10 a large portion of the material cut to form one of the slots 17 is split, retained and bent downwardly from the remainder of the strip 10 and then upwardly against and beneath the edge portions 15,16, extending therebeyond to form the ear portions 11*a*.

The use and operation of the invention are as follows:

As is well known, a drive or timing belt 40 is conventionally formed of a continuous length of flexible material having teeth 41 extending therefrom. The pitch diameter of the belt runs through the body thereof as shown in broken line in FIG. 11. As the belt is turned about a hub or belt support, the pitch diameter of the belt changes with the hub or support diameter. At the same time the pitch dimension is reduced or expanded as the pitch diameter is reduced or expanded, as illustrated by the dimension "A" of a straight belt portion and by the reduced dimension "B" of the curved belt portion in FIG. 11. In the present invention, it will be observed that the pitch diameter of strip 10 will run through the edge or body portions 15,16 as shown in dotted line in FIG. 12. The pitch diameter of strip 10 and the pitch dimension of elements 17,18 will thus vary with the diameter of the strip in precisely the manner in which the pitch diameter and pitch dimension of the belt and teeth vary with its diameter as indicated at "*a*" in FIG. 13 and at "*b*" in FIG. 12. The operator takes a suitable length of strip 10 and coils it to the diameter desired. The strip 10 is then secured in the selected circular configuration, the segments 25 or clips 30 providing appropriate means for such securement. Slots 17 in an overlapping portion of strip 10 will be aligned with the identical slots 17 in underlying portions of strip 10. The pulley segments 3,4 are then opened to receive the belt 40 and belt support 10 about shaft 2 and then closed to receive the ears 11 in the aligned slots 3*b*, 4*b* and to receive the outer surfaces of the edge portions 15,16 against the faces 3*a*, 4*a* of the pulley segments 3,4. At this point the pulley structure 1 is secured by a suitable means, such as the means 5, to its position on sleeve 1*a* and thus on shaft 2 and the pulley is ready for operation. The pulley may be thus employed as either a driving or a driven pulley.

Should the operator desire to change the speed of the pulley structure 1, and thus to change its speed ratio with a second pulley or mechanism driven by or driving the belt 40, it is only necessary, using the simplest of tools, to disengage the means 5, rotate one or both of the pulley segments 3,4 to separate them, release the overlapping end portion of the strip 10 and revise the diameter of the strip 10 to that desired. Variations of as little as one belt tooth or one of the slots 17 may be thus accomplished. If a belt 40 having a ½ inch pitch were employed, for example, and a diameter of 7.96 inches for strip 10, the latter would have 50 exposed slots and a change of one slot would produce a 2 percent speed change.

With the belt 40 in place on the support 10 teeth 41 penetrate slots 17. When belt 40 is the driving element, the leading edge of each tooth 41 engages the leading edge of its associated slot 17. When support 10 is the driving element the trailing edge of each slot 17 engages the opposed trailing edge of its associated tooth 41. The desired penetration and engagement of belt teeth 41 is thus accomplished, the pitch change of slots 17 changing with the selected diameter of strip 10 in correspondence with the pitch change of teeth 41.

The embodiments of the invention in which an exclusive property or privilege is claimed are defined as follows:

1. A belt support for toothed belts and the like, said support comprising an elongated strip of bendable material, said strip having a longitudinal body portion, an offset slot portion and a plurality of slots longitudinally spaced throughout substantially the entire length of said slot portion.

2. The structure of claim 1 wherein said strip is coilable upon itself to form a substantially circular belt support of variable diameter.

3. The structure of claim 1 wherein said body portion lies in a first plane and said slot portion lies in a second plane paralleling said first plane.

4. The structure of claim 1 wherein said strip is coiled upon itself to form a substantially circular support, said body portion lies in a first substantially circular plane and said slot portion lies in a second substantially circular plane within said first plane and paralleling said first plane.

5. A variable speed device including a pair of variably spaced segments, a constant-width belt support carried by and between said segments, abutment means on said support and on at least one of said pulley segments for precluding relative rotation between said support and said pulley segments.

6. The structure of claim 5 wherein said belt support is variable in diameter and said pulley segments are relatively movable toward and away from each other to clamp said belt support therebetween at each of its diameters.

7. The structure of claim 5 wherein said belt support comprises an elongated strip of bendable material having a plurality of longitudinally spaced slots formed therein, and means for securing said strip in coiled form at various diameters on and between said segments.

8. The structure of claim 5 wherein said abutment means includes ear and slot means formed on at least one of said pulley segments and on said support.

9. The structure of claim 1 wherein said body portion includes spaced edge portions and said slot portion of said strip lies in a plane offset from and paralleling the plane occupied by said edge portions, said edge portions occupying a first plane, said slot portion occupying a second plane, said strip including joinder portions joining said slot portion to said edge portions.

10. The structure of claim 1 characterized by and including at least one ear segment extending laterally from at least one of said edge portions.

11. The structure of claim 10 wherein said ear segment is formed by a link extending beneath said strip and secured thereto.

12. The structure of claim 1 characterized by and including means for securing said strip in overlapped, coiled, substantially circular configuration.

13. The structure of claim 12 wherein said means includes segments defined in forming one of said slots and depending beneath said strip, said segments being insertable through one of said slots in an underlying portion of said strip and extendable therebeneath.

14. The structure of claim 13 in which said depending segments comprise yieldable snap-action elements.

15. The structure of claim 12 wherein said means for securing said strip in a coiled, substantially circular configuration includes a pair of generally U-shaped clips, said clips being formed and adapted to secure upper and lower end portions of said strip in overlying configuration.